United States Patent [19]

Popp

[11] 4,054,325
[45] Oct. 18, 1977

[54] PNEUMATICALLY CONTROLLED HYDRAULIC TRAILER BRAKE SYSTEM

[75] Inventor: Roger C. Popp, Chesaning, Mich.

[73] Assignee: Midland-Ross Corporation, Cleveland, Ohio

[21] Appl. No.: 727,282

[22] Filed: Sept. 27, 1976

[51] Int. Cl.² .............................................. B60T 13/60
[52] U.S. Cl. ......................................... 303/7; 91/459; 137/627.5
[58] Field of Search .................. 303/7, 114, 115, 118, 303/119; 91/376 R, 459; 137/627.5; 251/30, 322, 323

[56] References Cited

U.S. PATENT DOCUMENTS

| | | | |
|---|---|---|---|
| 2,997,028 | 8/1961 | Ayers | 91/376 R |
| 3,168,352 | 2/1965 | Stelzer | 303/7 |
| 3,790,807 | 2/1974 | Rossigno | 303/7 |
| 3,800,666 | 4/1974 | Kasselmann | 91/459 |
| 3,909,075 | 9/1975 | Pittet et al. | 303/7 |
| 3,948,567 | 4/1976 | Kasselmann et al. | 303/7 |
| 3,951,464 | 4/1976 | Donahue et al. | 303/7 |
| 3,981,542 | 9/1976 | Abrams et al. | 303/7 |

*Primary Examiner*—Trygve M. Blix
*Assistant Examiner*—Edward R. Kazenske
*Attorney, Agent, or Firm*—Woodrow W. Portz

[57] ABSTRACT

Disclosed herein is a trailer brake control system comprising a trailer-mounted servo-motor type booster in direct operating connection, e.g., by hydraulic lines, with the trailer wheel brakes, an electrical transducer and signal amplification apparatus mounted on the towing vehicle, and a solenoid synchronizing valve for controlling the booster operably positioned between the signal amplification apparatus and the booster for translating electrical signals of varying magnitude into correspondingly varying brake action. The system enables the operator of a tow vehicle and trailer combination to operate the trailer brakes with power-applied effort which is proportional to manual pedal effort applied to the braking system of the tow vehicle, or optionally, to operate the trailer brakes independently of the tow vehicle brakes to any extent desired through manual control of the signal amplification apparatus.

4 Claims, 7 Drawing Figures

PNEUMATICALLY CONTROLLED HYDRAULIC TRAILER BRAKE SYSTEM

BACKGROUND OF THE INVENTION

In connection with heavy duty highway vehicles, such as large tractor-trailer rigs, excellent brake technology has developed on the basis of high-pressure air systems which power the brakes of both the tractor and the trailer. Such systems are, in general, too expensive to install on pleasure cars and light trucks which are occasionally used to tow vacation trailers or the like. It is of definite economic advantage to be able to use the auxiliary power facilities of an ordinary motor car, such as the 12 volt electrical system, engine intake manifold vacuum, and brake or power steering hydraulic systems to assist in the operation of trailer brakes.

The problems involved in employing these facilities to operate a trailer brake system to full satisfaction continue to trouble the related industries. The approach taken in developing the present invention is to provide the trailer with an independent braking system, preferably hydraulic, including a power booster from which hydraulic affect is transmitted to individual wheel brake mechanisms. Such transmission of braking effort may also be done by known rod or cable means connecting the booster with the wheel brakes. Present technology provides suitable electrical transducers (see U.S. patent application Ser. No. 699,897 filed June 25, 1976) and well developed electrical amplification equipment, but there is a lack of suitable apparatus for accomplishing the reverse transduction of electrical signals transduced from the operation of the tow vehicle's brake system to appropriate responses of the booster unit of the trailer brake system. If vacuum power from the tow vehicle is utilized as a medium in such reverse transduction, then the essential problem is in obtaining pneumatic pressures for operation of the booster unit which are proportional to the electrical signals produced in the tow vehicle. Also entailed is the necessity for sustaining pneumatic pressures at any level needed for maintaining desired braking effort.

It is an object of this invention to provide a braking system carried by a tow vehicle and trailer therefor for operation of the trailer brakes wherein the trailer brakes may be controlled solely by electrical and pneumatic, preferably vacuum, power supplied by the tow vehicle.

Another object is to provide a trailer brake system wherein the portion carried by the trailer comprises a booster unit and brake parts actuated thereby as a subsystem independent of the tow vehicle except for transducing signal media and a source of positive or negative fluid pressure.

It is also an object to provide a trailer brake system which may be actuated to braking effort proportional through a desired range to that imposed through a corresponding range of brake effort on the tow vehicle; also to be able to change the magnitude of trailer braking action in respect to any selected level of braking effort of the tow vehicle while retaining proportionality throughout a range of braking effort; and also to be able to operate the trailer brake separately from the tow vehicle brakes through manual adjustments of elements of the control apparatus.

Another object is to provide a trailer brake system that is extremely responsive and accurate in response to demands for braking effort throughout its operating range.

It is also an object to have a trailer brake system to be free of lag in operation (hysteresis) due to friction, etc. of control components, and to have very low hysteresis from any source at low braking effort.

SUMMARY OF THE INVENTION

In the embodiment of the brake system of this invention as described herein, tow vehicle electrical power and engine vacuum are used to operate a hydraulic brake system on the trailer. Electrical brake controlling mechanism including a pressure transducer is housed normally in a small container mounted in the tow vehicle and wired for power into the tow vehicle's electrical system with the transducer being hydraulically connected to the tow vehicle's brake system. The controller through the transducer monitors the tow vehicle's brake pressure and supplies a proportional electrical current to the solenoid of a synchronizing valve preferably located in the trailer adjacent, or attached, to the housing of the booster. The synchronizing valve responds to the controller current by proportionally energizing the booster. The solenoid valve controls the difference in the different pressures (or levels of vacuum) acting on opposite sides of the diaphragm within the power booster to generate hydraulic output pressure of the booster which acts on hydraulic wheel brake mechanisms of the trailer.

The portion of the brake system carried on the trailer basically consists of a vacuum reservoir, a synchronizing valve, a power brake booster, a normally open check valve, a brake release valve, a vacuum line and electrical lines leading to the solenoid of the synchronizing valve which are capable of being coupled with corresponding lines of the tow vehicle.

In the system described herein, the trailer brakes are automatically applied at any time the trailer vacuum supply line is severed or disconnected whereby inrushing atmospheric pressure causes the booster to generate hydraulic pressure which applies the trailer brakes. The brake release valve is provided for releasing the applied trailer brakes.

The power brake booster mounted on the trailer typically comprises a sealed housing partitioned by a flexible diaphragm to divide the housing into a first and second chamber with an actuating rod extending through the first chamber into connection with a central portion of the diaphragm. A spring mounted in the first chamber urges the diaphragm and the rod to a brake-off position which deflates the second chamber and inflates the first chamber when the pressures of both chambers are equal.

The synchronizing valve, in its preferred form, comprises a solenoid and a valve assembly attached together in generally tandem axial relationship. The valve has the function of supplying a fluid to a device to be controlled, normally air, at an adjusted control pressure from the second chamber of the booster within a range established by a higher supply pressure and a lower supply pressure connected with the valve. The structure of the valve causes the control pressure to be proportional to the electric current passed through the coil of the solenoid from the electrical controller.

The valve assembly of the synchronizing valve comprises a housing enclosing in the order named preceding in a direction away from the solenoid, a first chamber having an inlet port connected with the first chamber of the booster and the vacuum line of the tow vehicle, a second control chamber having an outlet port connected with the second chamber of the booster, and a third chamber having an inlet port for receiving the higher pressure fluid, normally atmospheric air. The valve assembly further comprises an annular valve seat located at the end of the third chamber nearer the solenoid and facing away therefrom. The second and third chambers of the housing are communicable through the valve seat. A valve member is supported on the third chamber for reciprocation toward and away from the above-named valve seat and is engaged therewith when the solenoid is not activated. Resilient means urges the member toward the seat.

The valve housing contains a spool connected in axial tandem relation with the plunger of the solenoid. The spool is reciprocably supported within the first and second chambers of the housing. A flexible diaphragm centered about the spool, is connected in sealed relation with the spool and the surrounding wall of the housing for separating the first and second chambers of the housing. The spool is at least partially hollow to provide a central passageway extending from an opening of the spool in the first chamber to its open end in the second chamber more remote from the solenoid plunger. The first and second chambers each contain separate springs seated in the housing and extending toward each other and the diaphragm to axially urge the spool toward a neutral position corresponding to equal pressures in the first and second chambers of the housing. This neutral position places the open end of the spool in spaced relation with the valve member at de-energized condition of the solenoid.

At minor activation of the solenoid, the spool is movable by the plunger to engage the member and seal the first chamber from the second chamber. At greater activation, the spool unseats the valve member to a position spaced from its seat to enable passage of the higher pressure fluid from the third chamber into the second chamber.

As the pressure rises in the second chamber, pressure is exerted on the diaphragm which is resisted by the solenoid and the lesser pressure in the first chamber. The result is movement of the spool towards its neutral position which causes the valve member to seat again and allow the increased pressure in the second chamber to be retained until there is a drop in excitation of the solenoid corresponding to a reduction in pedal pressure in the tow vehicle or other adjustment of the electrical controlling apparatus. A reduction in the solenoid excitation causes the spool to retract from the seated valve member whereupon pressures equalizes in the first and second valve chambers to cause equalization in both booster chambers and release of the brakes.

DESCRIPTION OF THE PREFERRED EMBODIMENT

Figure 1:
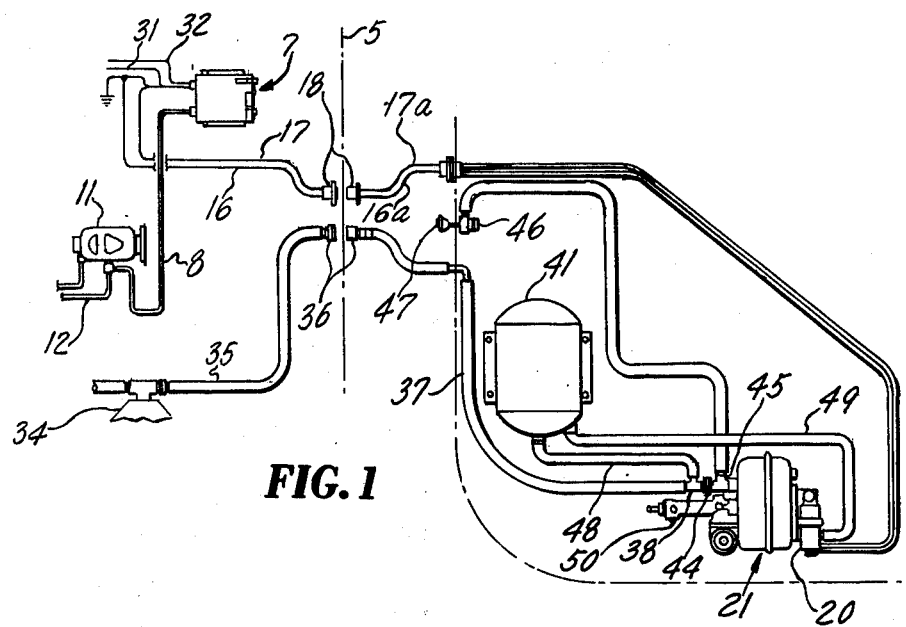
FIG. 1 is a schematic view of a major part of trailer brake actuating apparatus in accordance with the invention as carried by a tow vehicle and a trailer.
Figure 2:
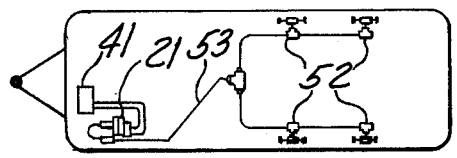
FIG. 2 is a schematic plan view of a trailer showing trailer-mounted components of the braking system.
Figures 5, 6, 7:
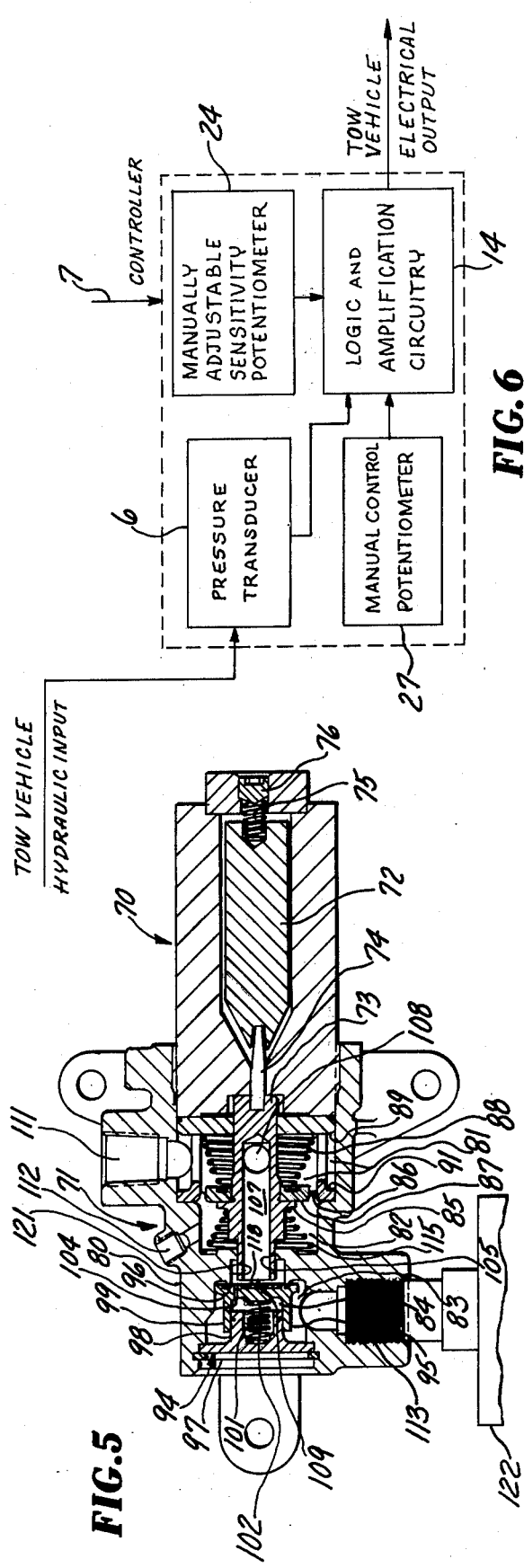
FIG. 5 is a view in section taken along the longitudinal axis of a synchronizing solenoid valve included as a component of the system of FIG. 1.
FIG. 6 is a diagram identifying portions of a controller included in the apparatus of FIG. 1 and exteriorly viewed in FIG. 4.
FIG. 7 is a diagram indicating a general arrangement of apparatus of FIG. 1 according to function.

FIGS. 1 and 7 depict the apparatus of the invention in general with major components thereof illustrated in FIG. 1. A dot-dash line 5 separates the apparatus at the left thereof carried on the tow vehicle from that at the right carried on the trailer. Considering first, the apparatus at the left of line 5, a pressure transducer 6 within the controller 7 (see FIG. 6) is connected by a hydraulic line 8 with a master cylinder 11 to sense changes of hydraulic pressure produced in a wheel brake line 12 of the tow vehicle such as when using the brake pedal. Any hydraulic pressure registered by the transducer is processed within the controller through logic and amplification circuitry 14 to produce a current transmitted through circuit lines 16,17 leading to a quick disconnect coupling 18 between the vehicles. Lines 16,17 are continued as a circuit through lines 16a,17a of the trailer to the solenoid of a synchronizing valve 20 mounted on a power booster 21 fixed to the trailer structure.

The intensity of the signal corresponding to any pressure level registered by the transducer 6 within the range of pressures transmitted thereto through line 8 may be adjusted by means of the manually adjustable sensitivity potentiometer 24 to modify the electrical output of logic and amplification circuitry 14. For example, the operator of a tow vehicle and trailer combination may wish to have a major portion of the total braking affect of the combination exerted by the trailer to avoid jackknifing. In this event, potentiometer 24 is adjusted to cause the electrical output of the circuitry 14 to occur in a higher range than otherwise while maintaining a good proportionality of the trailer braking affect with the tow vehicle throughout a full range of low to high deceleration rates of the tow vehicle-trailer combination. For adjusting the potentiometer 24, a rotatable knob 25 is provided along an exterior surface, of the housing for the controller 7. At times, the operator will wish to operate the trailer brakes independently of the tow vehicle brakes. For this purpose, the controller 7 contains a manual control potentiometer 27 provided with an exterior linearly movable control lever 28 which has circuit capability for overriding the pressure transducer 6 and permitting the operator to signal a desired trailer braking effort from the tow vehicle by manipulation of the lever 28. The power required for current amplification in the controller 7 is derived through lines 31,32 wired into the electrical system of the tow vehicle.

As the booster 21 requires a vacuum in varying degrees for trailer braking operation, the source of vacuum is the tow vehicle, more particularly, the engine intake manifold 34. Vacuum is communicated therefrom to the trailer through tow vehicle line 35, quick disconnect coupling 36 and the trailer vacuum line 37. As shown, vacuum line 37 terminates in a tee fitting 38 enabling vacuum pressure to be drawn within a reservoir 41 and the first chamber 42 of the booster 21. A normally-open break-away check valve 44 separates tee fittings 38,45 to maintain vacuum in the first chamber in the event of trailer break-away. The tee fitting 45 also connects with a brake release valve 46 which can be operated by knob 47 to relieve trapped vacuum in the booster first chamber 42 and thereby release the automatically set brakes of the trailer after break-away. The vacuum developed in the reservoir 41 through line 48 is communicated through line 49 from the reservoir to the synchronizing valve 20 to provide therein the lower of two supply pressures between which the valve establishes an intermediate control pressure communicated to the second chamber 51 of the booster 21.

Figure 3:
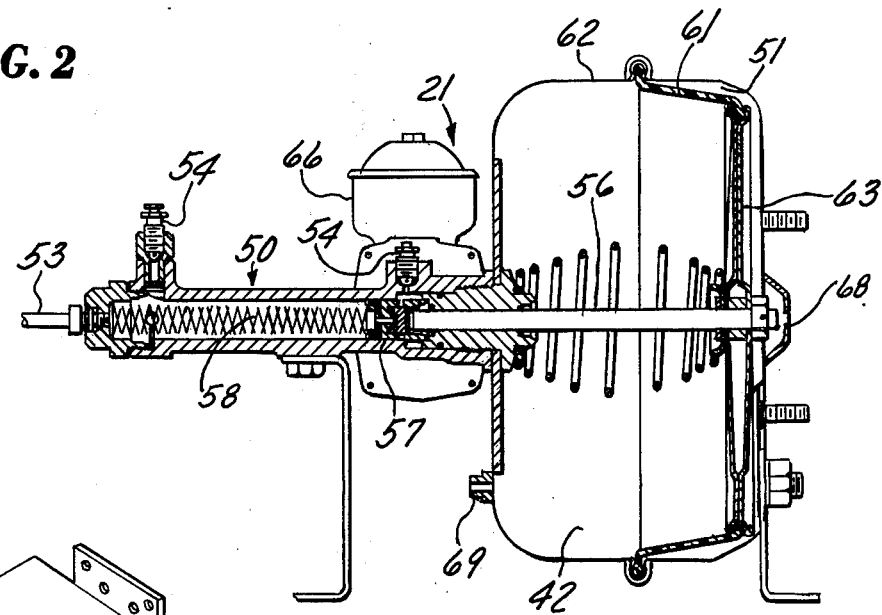
FIG. 3 is a section view taken along the axis of a power booster forming a portion of the brake system of FIG. 1.
Figure 4:
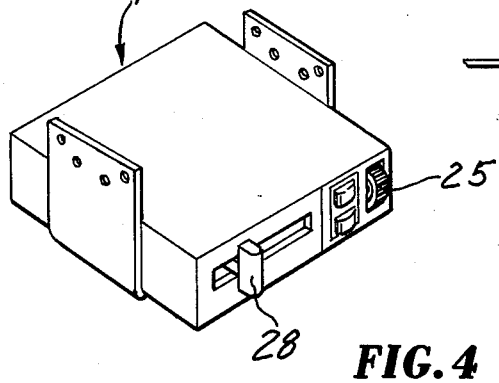
FIG. 4 is a perspective exterior view of a controller included in the apparatus of FIG. 1.

Booster 21 is a standard penumatically actuated unit provided with a hydraulic piston-cylinder pump 50 adapting the booster for hydraulic brake actuation. As shown, the pump 50 is connected to wheel brakes 52 by hydraulic line 53. In its inoperative condition as illustrated in FIG. 3, the operating rod 56 of the pneumatic actuator is fully retracted along with the piston 57 of the pump 50. Springs 58 maintain the piston in contact with the rod 56. In this condition, pressures are equal within the chambers 42,51; normally, they are at the full vacuum developed in reservoir 41. Chambers 42,51 are separated by a flexible diaphragm or the equivalent sleeve 61 and rigid diaphragm 63 as shown. The flexible sleeve 61 secured along its larger diameter edge to the housing 62 and along its smaller circumference to the disc-like rigid diaphragm 63 shown fastened to the rod 56.

Any reduction in the vacuum, i.e., an increase in pressure, within the chamber 51 relative to the pressure existing within chamber 42 causes the rod and diaphragm assembly to advance toward the pump 50 and thus to cause the liquid normally contained within the pump 50 to be forced outwardly thereof into a hydraulic brake system. The pump is provided with a reservoir 66 to maintain adequate liquid in the pump 50 and the associated hydraulic system.

Housing 62 has a connecting boss 68 for connecting the second booster chamber 51 in fluid connection with a second valve chamber of the valve 20 in which the control pressure is developed. The housing has another connecting boss 69 enabling connection of the first chamber 42 of the booster with a vacuum source such as line 37 and/or the reservoir 41.

FIG. 5 illustrates solenoid valve 20 which has the critical function of synchronizing, i.e., maintaining the proportionality of, the brake effort exerted on the trailer wheels with the electrical output of controller 7. Valve 20 has, as major portions, a solenoid 70 and a valve assembly 71 fixed to the coil and housing portion of the solenoid. The solenoid has a plunger 72, the assembly 71 has a spool 73 aligned coaxially in end-to-end relation in engagement with an intermediate link 74. The plunger-link-spool assembly is maintained in engaged relation by a light compressor spring 75 standing between the plunger and a threaded plunger 76 received in an end opening of the solenoid housing to oppose springs 88 and 115.

The plunger-link-spool assembly reciprocates in a linear axial path within the valve and is urged in a direction toward the valve assembly end of the valve when the solenoid is energized. The valve assembly has a housing 80 which in combination with other parts of the assembly 71 define a first chamber 81, a second chamber 82, a third chamber 83, and a fourth chamber 84. The first and second chambers are separated by a centrally apertured diaphragm 86 secured by means, such as a press fit, along its inner periphery between a flange 85 of the spool 73 and a washer 87 bearing against the diaphragm and the flange. A circular tapered compression spring 88 has a smaller end seated on the washer 87 and its larger end seated on a spool-guiding and valve sealing washer 89 defining the end of the first chamber 81 spaced from the diaphragm 86. A sleeve 91 spaces the washer 89 from the diaphragm with the end of the sleeve away from the washer 89 cooperating with a shoulder 92 of the housing 80 to confine or sandwich the outer periphery of the diaphragm 86 therebetween. The diaphragm thus constitutes a sealed flexible wall separating the first chamber and the second chamber of the housing 80.

The second chamber 82 is separated from the third chamber 83 by a valve member 95 and a valve seat 96.

The valve member 95 is supported on a removable portion of the housing, i.e., a plug 94 secured in the end of the housing by a snap ring 97. The plug has a hollow cylindrical boss 98 which extends in telescoping sealed relationship with the inner surface of a cylindrical flange 99 of the cup-shaped member 95. A spring 101 housed and seated within the chamber 84 engages the inner circular surface 102 of the member to urge the member toward its seat 96. An aperture 104 through the disc portion of the member 95 permits constant fluid communication between the second chamber 82 and the fourth chamber 84. The housing forms a plurality of inward radially extending fingers at 105 which allow the chamber 82 to extend into adjacency with the seat 96.

The spool 73 has an axially extending passageway 107 forming a laterally extending passageway 107 forming a lateral opening 108 opening into the first chamber 81. The passageway terminates at one end as the open end 109 of the spool to enable fluid communication between the first chamber 81 and the second chamber 82.

The first chamber has a port 111 which receives a terminal of the vacuum supply line 49. The second chamber 82 has a port 112 connected by a suitable duct means with the fitting 68 of the booster 21 thereby placing the second valve chamber in communication with the second chamber 51 of the booster. The third chamber 83 has a port 113 normally connected with the atmosphere and adapted for receiving a connection 114 linking the third chamber with an air filter 122.

A spring 115 substantially identical to spring 88 is confined within chamber 82 between an annular radial seating surface 116 and the spool flange 85 which supports the opposing end of spring 88. The springs 88 and 115 oppose each other but establish a neutral or retracted position of the plunger-link-spool assembly at an unactivated condition of the solenoid. In such neutral condition, the spool is spaced from the surface 118 of the valve member 95 to allow equal pressures in the first and second chambers of the valve assembly. Such valve condition corresponds to the condition of the booster shown in FIG. 3.

The fourth chamber 84 has significance in the present invention from the fact that the internal surface of the flange 99 is of about the same diameter as the internal surface 121 of the portion of the second chamber adjacent the valve seat 96. The orifice 104 permits equalization of pressures on both sides of the disc portion of the valve member 95 at seated condition as shown in FIG. 5. However, when the end of the spool engages the valve member, the first chamber 81 is sealed or isolated from the second chamber. As a lower pressure exists within the spool and the first chamber, a pressure difference acting on opposite sides of the valve member exists when the spool engages the member. The result is that more pressure is applied to surface 102 than to surface 118 of the valve member. This has the affect on the brake system to minimizing hysteresis affects at low force braking applications in the trailer.

To place this system in operation, low pedal pressure on the master cylinder 11 will result in an increase of hydraulic pressure in the wheel brake line 12 and line 8 connecting with the pressure transducer 6. The signal current passing through the pressure transducer activates the logic and amplification circuitry 14 which thereupon generates a current in the circuit lines 16,17,16a,17a connecting with the coil of the solenoid 70. The solenoid is excited in proportion to the hydraulic pressure imposed on the transducer and initially the plunger-link-spool assembly moves as a unit to engage the end of the spool with surface 118 of the valve member.

If the solenoid current is sufficient, the plunger-link-spool assembly moves to unseat the member 95 from its seat 96. Air rushes in the port 113 and the third chamber past the valve seat into the second chamber 82 and the second chamber 51 of the booster. With the pressure being increased in the second valve chamber, the pressure differential between the first and second chamber is increased with resulting thrust on the diaphragm 87 and retractive movement of the plunger-link-spool assembly toward the solenoid. With the spool end 109 in engagement with the valve member 95, the spool retracts until the member 95 seats again against the seat 96. The valve condition thus established corresponds to steady pedal pressure at a sustained braking effort since the booster has responded to the increased pressure in the second or control valve chamber.

If, at this instant, the pedal pressure is lessened, there is a corresponding reduction in solenoid current and a further retraction of the spool away from the now seated valve member 95. At this point, pressure equalization takes place between the first and second valve chambers until the pressure differential acting on the diaphragm is again equalized by the reduced thrust exerted by the solenoid on the plunger-link-spool assembly.

Assuming some solenoid activation, the assembly will assume a position wherein the spool end 109 engages the member and the member is seated on seat 96. This state of equilibrium may be attained at any significant steady pedal pressure of the tow vehicle. The valve will thus respond to any steady solenoid force to establish the appropriate opposing spring force and pressure force generated on the spool as the result of a pressure difference between chambers 1 and 2 resulting in equilibrium. With equilibrium state existing when the spool engages the valve member 95 which in turn engages its seat 96, obviously higher pedal pressures will generate higher solenoid forces which in turn cause the member 95 to be again unseated to allow a rise in pressure in the second valve chamber and the second booster chamber until equilibrium state is again established.

What is claimed is:

1. A braking system carried in a towed vehicle and a towing vehicle for operating the brakes of the towed vehicle comprising:

control apparatus on the towing vehicle comprising signal means operable throughout an input signal range, and electrical means responsive to the signal means to generate a solenoid activating output current throughout a range of current corresponding to said signal range;

a power brake booster on the towed vehicle having a brake actuating rod, a sealed housing partitioned by a flexible diaphragm dividing the housing into first and second chambers, said rod extending through the first chamber into connection with a central portion of said diaphragm, and spring means urging said diaphragm and rod to a brake-off position deflating said second chamber and inflating said first chamber;

a solenoid valve on one of the vehicles comprising a solenoid having a coil, a central plunger, and a valve assembly attached thereto for supplying a fluid at a control pressure in a range between a higher supply pressure and a lower supply pressure in proportion to an electric current passed through the coil of the solenoid by said electrical means, said valve assembly comprising:

a housing enclosing in the order named proceeding in a direction away from said solenoid, a first chamber and an inlet port therefor for said lower pressure fluid, a second control chamber and an outlet port therefor, a third chamber and an inlet port therefor for said higher pressure fluid, and an annular valve seat located at the end of the third chamber nearer the solenoid and facing away therefrom, said second and third chambers being communicable through said seat;

a valve member supported in said third chamber for reciprocation toward and away from said seat and being normally engaged with the seat;

resilient means for urging said member toward said seat;

a spool in axial tandem-connected relation with said plunger and reciprocably supported within said first and second chambers of the valve assembly;

a flexible diaphragm in concentric relation with the spool and connected in sealed relation with the spool and the housing for separating the first and second chambers of the valve assembly;

said spool having an open end remote from said plunger and a central passageway extending from an opening of the spool in said first chamber to said open end;

separate spring means seated in said housing and seated on the spool to act toward each other on said spool to axially urge the spool toward a neutral position corresponding to equal pressures in the first and second chambers in the housing with said open end in spaced relation with said member when said solenoid is deenergized and said member is in seated position;

said spool being movable by said plunger to engage said member and then carry it to a position spaced from said seat with said member closing off said open end to enable passage of fluid from said third chamber to said second chamber;

a source for said lower supply pressure connected with said inlet port of said first housing chamber and said first booster chamber;

a source for said high supply pressure connected with the inlet port of said third chamber;

said plunger upon electrical excitation of the solenoid being movable from a retracted position corresponding to a neutral position of the spool permitting communication of the first housing chamber with the second housing chamber and equal pressures therewithin to a second position against said valve member terminating communcation between the first and second housing chambers and thence to a third position wherein communication of the first and second housing chamber remains terminated and said member is unseated to place the third chamber in communication with said second housing chamber to transmit a higher pressure to said second booster chamber.

2. The braking system of claim 1 wherein:

said tow vehicle has a hydraulic brake system;

said signal means comprises a pressure transducer connected in hydraulic pressure transmitting relation to said tow vehicle brake system;

said electrical means comprising logic and amplification circuitry connected for signal input with said transducer and for amplified electrical output with said solenoid.

3. The braking system of claim 1, comprising:

manual control potentiometer means and means for optionally connecting said potentiometer means and said transducer with said logic and amplification circuitry for selectively establishing control of towed vehicle brakes independently of the tow vehicle brakes through said potentiometer, or dependently of the tow vehicle brakes through said transducer.

4. The braking system of claim 1 wherein:

said source of the lower supply pressure is vacuum power generated on the tow vehicle; and said source of said higher pressure is the atmosphere.

* * * * *